UNITED STATES PATENT OFFICE 2,596,730

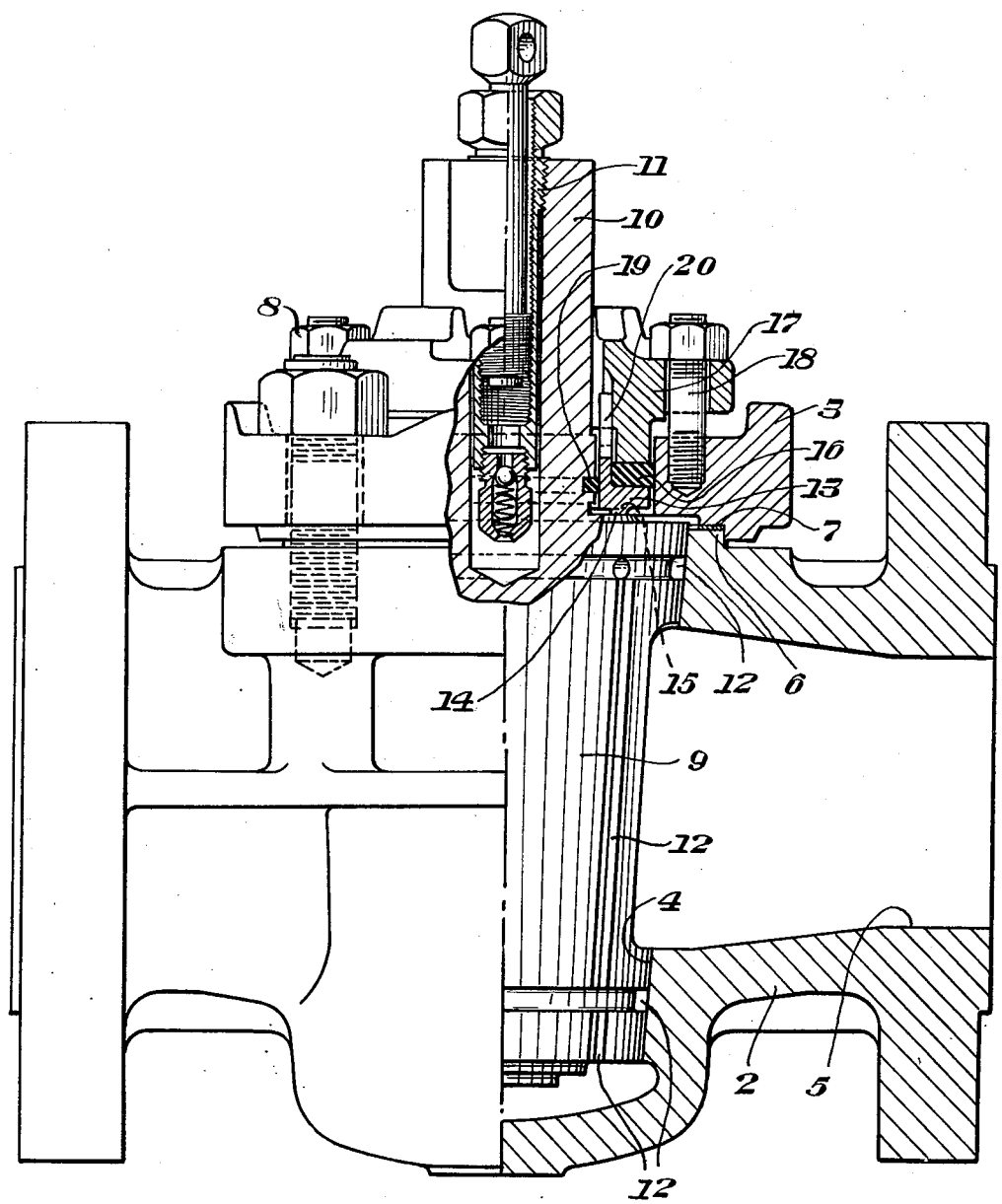

PLUGCOCK

Ludwik Seinfeld, New Providence Township, Union County, N. J., assignor, by mesne assignments, to H. K. Porter Company, Inc., Pittsburgh, Pa., a corporation of Pennsylvania Application June 3, 1947, Serial No. 752,221

7 Claims. (Cl. 251—93)

This invention relates to plug cocks and has to do with an improved construction whereby the effective life of a plug cock is increased and its operation facilitated. In certain of its more specific aspects the invention relates to lubricated plug cocks and to a construction which improves the operability of the cock and also provides for more effective lubrication thereof than has heretofore been provided for.

For purposes of illustration and explanation the invention will be described as embodied in a lubricated plug cock but it is to be understood that it is not limited to such embodiment.

A lubricated plug cock comprises a seat and a rotatable plug having a body engaging the seat and an axial stem, means being provided within the stem for forcing lubricant through passage means in the plug body to lubricate the contacting surfaces of the plug and seat and thus facilitate turning of the plug in the seat.

Means are provided for maintaining the plug seated and for sealing the plug to the seat to prevent leakage. The sealing means heretofore provided has generally included resilient sealing means normally maintained under substantial pressure and customarily in contact with the plug stem so that when the plug is turned the resilient sealing means is subjected to a tearing action which results in its rapid deterioration.

I have devised a plug cock in which the resilient sealing means which is maintained under axial compression is also maintained out of contact with the plug stem, other resilient sealing means separate from the first mentioned resilient sealing means preferably being provided to seal against the plug stem. The latter mentioned resilient sealing means are removed from the influence of the means for maintaining the plug seated. As a result each of the resilient sealing means is subjected only to what may be termed unidirectional compressive action whereby its life is considerably prolonged. Also I obtain a more effective seal which is less likely to leak.

I provide, in a plug cock having a seat and a rotatable plug, the plug having a body engaging the seat and an axial stem, means maintaining the plug seated, said means including a ring disposed about the plug stem and bearing on the plug body and means for pressing the ring against the plug body, the ring having a reduced bearing rib engaging the plug body. When the plug cock is a lubricated plug cock means are provided for lubricating the plug in its turning movement in the seat. In such case the reduced bearing rib on the ring which engages the plug body preferably has lubricant passage means therethrough intersecting the face thereof engaging the plug body.

I desirably provide resilient sealing means engaged by the ring which is disposed about the plug stem and bears on the plug body and also engaged by the means for pressing the ring against the plug body, the resilient sealing means being maintained out of contact with the plug stem. I also preferably provide other resilient sealing means separate from the first mentioned resilient sealing means sealing the ring to the plug stem, the second mentioned resilient sealing means being removed from the influence of the means for maintaining the plug seated. The ring preferably has a portion interposed between the first mentioned resilient sealing means and the plug stem maintaining such resilient sealing means out of contact with the plug stem. Means are also preferably provided for holding the ring against rotation when the plug is rotated. This obviates torsional stresses on the first mentioned resilient sealing means. Desirably a key is employed cooperating with the ring and the means for pressing the ring against the plug body preventing relative rotation therebetween but allowing for relative axial movement therebetween.

I further provide, in a plug cock having a seat comprising a base portion and a cover sealed to the base portion and having a rotatable plug, the plug having a body engaging the base portion of the seat and an axial stem extending through the cover, means maintaining the plug seated, said means including a ring disposed about the plug stem and bearing on the plug body, means for pressing the ring against the plug body, resilient sealing means maintained out of contact with the plug stem engaged by the ring and said last mentioned means and also engaging the cover and other resilient sealing means separate from the first mentioned resilient sealing means sealing the ring to the plug stem.

Other details, objects and advantages of the invention will become apparent as the following description of a present preferred embodiment thereof proceeds.

In the accompanying drawing I have shown a present preferred embodiment of the invention, the figure being half in elevation and half in central vertical cross-section and showing a lubricated plug cock.

There is provided a plug cock which comprises a plug seat having a base 2 and a cover 3. The base 2 comprises a plug receiving cavity 4 with which communicates a conduit or passageway 5. The plug cock may be of the usual type in which when the plug is in one rotative position flow of fluid through the conduit 5 is permitted and when the plug is in another rotative position flow of fluid through the conduit 5 is prevented.

The base 2 is upwardly open as shown, the opening being surrounded by an upwardly projecting flange 6 upon which the cover 3 is set. A gasket 7 seals the cover 3 to the base 2. The cover is maintained in place on the base by bolts 8.

To apply the plug to the seat the cover 3 is removed from the base 2, the plug is inserted and the cover 3 is replaced upon the base 2 and bolted down. The plug comprises a body 9 disposed in the cavity 4. Both the cavity 4 and the plug are of generally circular cross-section so that the plug may be turned in the cavity. Preferably, as shown, the cavity and plug are tapered as is well known in the art. The plug has an axial stem 10 which extends up through the cover 3 and is integral with the body 9. The stem 10 is hollow and contains means designated generally by reference numeral 11 for the purpose of leading lubricant to the desired areas. The lubricant is delivered through passageways 12 in the plug body to the coacting surfaces of the plug body and the base of the seat.

Disposed about the stem 10 and bearing upon the top of the plug body 9 is a ring 13 which is preferably of generally L-shaped cross-section as shown. The ring 13 has at its bottom a downwardly projecting bearing rib 14 engaging the top of the body 9, the rib 14 having therethrough lubricant passages 15 which intersect the face of the rib engaging the plug body and provide for effective lubrication of the contacting surfaces of the ring and plug body.

Disposed atop the generally horizontal leg of the ring 13 is a resilient sealing or packing ring 16 which may be of any suitable material, such as rubber, fiber, artificial rubber, plastic, etc. The vertically extending leg of the ring 13 is interposed between the sealing ring 16 and the stem 10 so that the sealing ring 16 is spaced from the stem and at no time engages it. A gland 17 is disposed about the stem 10 above the sealing ring 16, the bottom of the gland pressing downwardly on the sealing ring. The gland is maintained in place on the cover 3 by bolts 18. The sealing ring 16 is compressed between the ring 13 and the gland 17 and also engages the inner peripheral surface of the cover 3 to effect a seal preventing egress of fluid between the ring 13 and the cover 3.

Another resilient sealing ring 19 is provided between the stem 10 and the ring 13. Preferably the sealing ring 19 is disposed in an annular recess in the stem 10 as shown, the recess being of such dimension as to cause a portion of the sealing ring 19 to project into engagement with the ring 13. The sealing ring 19 prevents egress of fluid between the ring 13 and the stem 10.

Rotation of the ring 13 is prevented by a key 20 which enters keyways in the ring 13 and the gland 17. The key 20 allows relative axial movement between the ring 13 and the gland 17 but prevents relative rotation therebetween. By this provision the sealing ring 16 is relieved of any torsional stress, being subjected only to compression. The sealing ring 19 is subjected to torsional stress but is not compressed axially.

Thus I provide a plug cock having advantages in operability and durability by reason of the provision of the separate sealing rings as above described. The sealing ring 19 may be omitted in small plug cocks where a sufficiently tight seal can be maintained without it. In some instances the key 20 may be omitted, friction being sufficient to prevent turning of the ring 13 when the plug is turned.

While I have shown and described a present preferred embodiment of the invention it is to be distinctly understood that the invention is not limited thereto but may be otherwise variously embodied within the scope of the following claims.

I claim:

1. In a plug cock having a seat, a rotatable plug, the plug having a body engaging the seat and an axial stem, and an annular retaining portion disposed about the plug stem, means maintaining the plug seated, said means including a ring disposed about the plug stem, lying loosely within the annular retaining portion and bearing on the plug body and means pressing against the surface of the ring remote from the plug body for pressing the ring against the plug body, the ring having a bearing rib extending toward and engaging the plug body.

2. In a lubricated plug cock having a seat and a rotatable plug, the plug having a body engaging the seat and an axial stem having therein an outwardly facing annular recess, means being provided for lubricating the plug in its turning movement in the seat, means maintaining the plug seated, said means including a ring disposed about the plug stem and bearing on the plug body and means for pressing the ring against the plug body, the ring having a bearing rib extending toward and engaging the plug body, and resilient sealing means in said recess bearing against the ring.

3. In a plug cock having a seat, a rotatable plug, the plug having a body engaging the seat and an axial stem, and an annular retaining member separate from the seat and fastenable to the seat after insertion of the plug, means maintaining the plug seated, said means including a ring disposed about the plug stem, fastened to the annular retaining member and bearing on the plug body, means pressing against the surface of the ring remote from the plug body for pressing the ring against the plug body and resilient sealing means engaged by the ring and said last mentioned means and maintained out of contact with the plug stem.

4. In a plug cock having a seat and a rotatable plug, the plug having a body engaging the seat and an axial stem, means maintaining the plug seated, said means including a ring disposed about the plug stem and bearing on the plug body, means pressing against the surface of the ring remote from the plug body for pressing the ring against the plug body, resilient sealing means engaged by the ring and said last mentioned means and maintained out of contact with the plug stem and other resilient sealing means separate from the first mentioned resilient sealing means sealing the ring to the plug stem, the ring being uninterrupted between the first mentioned resilient sealing means and the second mentioned resilient sealing means.

5. In a plug cock having a seat comprising a base portion and a cover sealed to the base portion and having a rotatable plug, the plug having a body engaging the base portion of the seat and an axial stem extending through the cover, means maintaining the plug seated, said means including a ring disposed about the plug stem and bearing on the plug body, means for pressing the ring against the plug body, resilient sealing means maintained out of contact with the plug stem engaged by the ring and said last mentioned means and also engaging the cover and other resilient sealing means separate from the first mentioned resilient sealing means sealing the ring to the plug stem.

6. In a plug cock having a seat comprising a base portion and a cover sealed to the base portion and having a rotatable plug, the plug having a body engaging the base portion of the seat and an axial stem extending through the cover, means maintaining the plug seated, said means including a ring disposed about the plug stem and bearing on the plug body, a gland for pressing the ring against the plug body, resilient sealing means maintained out of contact with the plug stem engaged by the ring and gland and also engaging the cover and other resilient sealing means separate from the first mentioned resilient sealing means sealing the ring to the plug stem and removed from the compressive influence of the gland.

7. In a lubricated plug cock having a seat comprising a base portion and a cover sealed to the base portion and having a rotatable plug, the plug having a body engaging the base portion of the seat and an axial stem extending through the cover, means being provided for lubricating the plug in its turning movement in the seat, means maintaining the plug seated, said means including a ring disposed about the plug stem and bearing on the plug body, the ring having a bearing rib extending toward and engaging the plug body, the rib having lubricant passage means therethrough intersecting the face thereof engaging the plug body, a gland for pressing the ring against the plug body, resilient sealing means engaged by the ring and gland and also engaging the cover, the ring having a portion interposed between said resilient sealing means and the plug stem maintaining said resilient sealing means out of contact with the plug stem, a key cooperating with the ring and gland preventing relative rotation therebetween and other resilient sealing means separate from the first mentioned resilient sealing means sealing the ring to the plug stem and removed from the compressive influence of the gland.

LUDWIK SEINFELD.

REFERENCES CITED

The following references are of record in the file of this patent:

UNITED STATES PATENTS

| Number | Name | Date |
|---|---|---|
| 1,743,015 | Crosby | Jan. 7, 1930 |
| 2,029,438 | Nordstrom | Feb. 4, 1936 |
| 2,048,386 | Jacobsen | July 21, 1936 |
| 2,190,602 | Leach | Feb. 13, 1940 |
| 2,235,306 | Atkinson | Mar. 18, 1941 |
| 2,250,124 | Carter | July 22, 1941 |
| 2,296,649 | Mueller | Sept. 22, 1942 |